Figure 1:
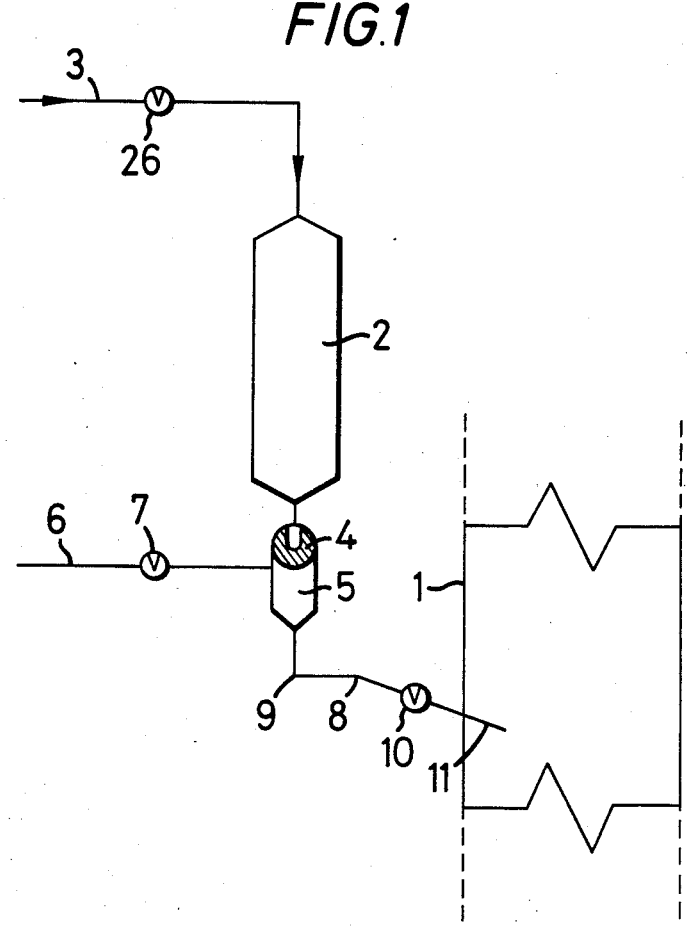

United States Patent [19]

Dumain et al.

[11] Patent Number: 4,687,381
[45] Date of Patent: Aug. 18, 1987

[54] DEVICE FOR INTRODUCING A POWDER WITH CATALYTIC ACTIVITY INTO A FLUIDIZED-BED POLYMERIZATION REACTOR

[75] Inventors: André Dumain, Martigues; Charles Raufast, Saint Julien les Martigues, both of France

[73] Assignee: BP Chemicals Limited, London, England

[21] Appl. No.: 716,030

[22] Filed: Mar. 26, 1985

[30] Foreign Application Priority Data

Mar. 30, 1984 [FR] France ............................. 84 04985

[51] Int. Cl.$^4$ ............................................. B65G 53/40
[52] U.S. Cl. ...................................... 406/52; 406/124; 406/146; 222/1; 222/53; 222/61; 222/195; 222/638; 422/131; 422/145; 526/86; 526/919
[58] Field of Search ................. 222/71, 61, 1, 70, 195, 222/53; 526/64, 86, 919, 920; 422/145, 131; 414/217; 406/52, 128, 146, 124

[56] References Cited

U.S. PATENT DOCUMENTS

| | | | |
|---|---|---|---|
| 2,613,832 | 10/1952 | Ogorzaly et al. | 526/86 |
| 2,985,324 | 5/1961 | Balentine | 414/217 |
| 3,012,024 | 12/1961 | Kavesh | 526/86 |
| 3,790,036 | 2/1974 | Miller | 406/128 |
| 3,846,394 | 11/1974 | Mitacek | 526/86 X |
| 3,876,602 | 4/1975 | Calvert et al. | 526/86 |
| 3,922,322 | 11/1975 | Roger et al. | 526/86 |
| 4,610,574 | 9/1986 | Peters | 422/131 X |

FOREIGN PATENT DOCUMENTS

| | | | |
|---|---|---|---|
| 0059080 | 1/1982 | European Pat. Off. | 526/901 |
| 0112215 | 3/1898 | Fed. Rep. of Germany | 406/128 |
| 2272728 | 12/1975 | France | 406/128 |
| 2106064 | 4/1983 | United Kingdom | 406/125 |
| 2111946 | 7/1983 | United Kingdom | 222/71 |

Primary Examiner—Joseph L. Schofer
Assistant Examiner—F. M. Teskin
Attorney, Agent, or Firm—Brooks Haidt Haffner & Delahunty

[57] ABSTRACT

Device and process for introducing a powder with catalytic activity into a fluidized bed polymerization reactor (1), the said device comprising:
a storage enclosure (2) for powder with catalytic activity, provided with a feed line (3) for powder with catalytic activity and a shut-off valve (26), this enclosure being connected to a metering device (4) making it possible to deliver periodically a given volume of powder with catalytic activity,
an intermediate chamber (5), placed below the metering device to receive direct the powder delivered by the latter, this intermediate chamber comprising in its upper part a tube (6) bringing in a inert carrier gas, provided with a shut-off valve,
piping for conveying the powder (8) connecting the bottom part of the intermediate chamber to the fluidized-bed reactor, this piping having a portion which is more or less horizontal, the said powder conveying piping being provided with a full-bore rapid-opening valve (10).

8 Claims, 4 Drawing Figures

DEVICE FOR INTRODUCING A POWDER WITH CATALYTIC ACTIVITY INTO A FLUIDIZED-BED POLYMERIZATION REACTOR

The invention relates to a device an process for introducing a powder with catalytic activity into a fluidised-bed reactor in which there is carried out a polymerisation or copolymerisation of gaseous alpha-olefins.

It is known that alpha-olefins such as ethylene, or mixtures of alpha-olefins such as ethylene, propylene, 1-butene, 1-hexene, 4-methyl-1-pentene can be polymerized in the gaseous state in the presence of a catalyst system consisting, for example, (a) of a solid catalyst comprising a compound of a transition metal of Groups IV, V and VI of the Periodic Table of Elements, in particular titanium, it being possible for this solid catalyst also to comprise magnesium, and (b) of a cocatalyst comprising an organo-metallic compound of a metal of Groups II and III of the said Periodic Table of Elements, in particular an organo-aluminium compound. Such catalyst systems with a high activity have been described in particular in French Patent Nos. 2099311, 2116698, 2144080, 2529208 and 2529209.

It is also known that polymerisations and copolymerisations of alpha-olefins by means of the very active catalysts described above or of equivalent catalysts may be carried out according to a process utilising the fluidised-bed technique. These polymerisations and copolymerisations are then generally effected in a reactor with vertical axis in which the polymer particles in formation are maintained in the fluidised state by a rising gas stream containing the olefin or olefins to be polymerised. Such a reactor normally comprises in its lower part a perforated or porous plate, sometimes referred to as the fluidisation plate, which makes it possible to distribute the gaseous stream in the reaction medium and to maintain the polymer particles in the fluidised state above the bed. The reactor comprises a device for introducing solid catalyst into the fluidised-bed and a system for discharging the polymer produced, making it possible to maintain the level of the fluidised-bed constant.

As device for introducing the solid catalyst it is known that appliances comprising in general a storage enclosure for solid catalyst in powder form can be used, this enclosure being connected to a feed chamber provided with filling and emptying valves, and also feed piping connecting the said feed chamber to the fluidised-bed reactor. When the desired quantity of solid catalyst has been introduced into the feed chamber, the latter is pressurised with an inert gas at a pressure greater than that prevailing in the reactor, then the outlet valve is abruptly opened to permit the conveyance of solid catalyst through the feed piping into the fluidised-bed reactor.

Another device, very similar to the preceding one, consists in using, instead of the feed chamber provided with its filling and emptying valves, a metering device which must be gas-tight under pressure and whose job is to deliver a given quantity of a solid catalyst in powder form into the fluidised bed reactor. This metering device, which may be of the rotary type, comprises an internal chamber with a double aperture, which may be alternately filled with solid catalyst from the storage enclosure and emptied of the said solid catalyst under the pressure of a carrier gas which entrains it by a rapid current through the feed piping to the fluidised-bed.

These known devices generally have the drawback of introducing into the reactor comparatively high quantities of catalyst at low frequencies, these introductions of catalysts being separated by periods of non-operating time of varying lengths, which may be as long as 120 minutes. For this reason, the concentration of solid catalyst present in the fluidised-bed reactor undergoes fluctuations over a period of time. Moreover, when it is introduced into the fluidised-bed reactor, the solid catalyst is constantly subjected to compressions not only inside the feed chamber or the internal chamber of the metering device of rotary type, but also inside the feed piping which is traversed by the inert gas or the carrier gas at a comparatively high speed, of the order of 20 to 30 meters per second. Owing to this, the solid catalyst which emerges into the fluidised-bed reactor in the form of a dense and compacted powder penetrates deeply into the fluidised-bed, but disperses with difficulty. The poor dispersion of the catalyst inside the fluidised-bed results in causing runaways of the polymerisation reaction, sources of hot spots, and possibly agglomerates of molten polymer, leading to the stoppage of the reaction.

It is also known that a solid catalyst may be introduced according to a continuous process into a fluidised-bed reactor, in particular in order to maintain constant conditions in the reaction medium. In practice, however, such a process employs a very special feeding device, comprising in particular, feed piping of the capillary type, having for example an internal diameter comprised between 0.76 and 3.2 mm. An inert carrier gas conveys the solid catalyst through this capillary-type piping to the fluidised-bed reactor at a rate such that the solid catalyst is present in the form of a dispersion or suspension of low concentration in the said inert carrier gas. Because of this the solid catalyst which emerges into the fluidised-bed reactor disperses easily inside the fluidised-bed, but with a low degree of penetration into the bed. Consequently, it remains localised in a zone of the fluidised-bed close to the wall of the reactor, a zone where there is generally little movement, which may thus cause the formation of "hot spots" and consequently agglomerates. Moreover, it is known that such a process of feeding the solid catalyst may cause the formation of very fine catalyst particles by attrition phenomena during high-speed conveyance of the catalyst through the feed piping; now the presence of these very fine particles is prejudicial to the good operation of a fluidised-bed reactor. Furthermore, it appears that such a process involves the introduction of relatively large quantities of inert carrier gas into the fluidised-bed reactor, which is harmful to the polymerisation reaction yield.

A device and process have now been found making it possible to introduce a catalytically active powder into a fluidised-bed reactor in which there is carried out polymerisation or copolymerisation of gaseous alpha-olefins, whilst avoiding the above-mentioned drawbacks.

The device for feeding a catalytically active powder according to the invention is characterised in that it comprises:

a storage enclosure for the powder adapted to feed the powder to a metering device, the metering device being capable of communicating sequentially with the storage enclosure and with an intermediate chamber and permitting periodic delivery into this chamber of a metered volume of the powder, the intermediate chamber being placed below the metering device to receive direct the powder delivered by the latter, the said intermediate chamber having a capacity of at least 1.1 times device; a supply tube for inert carrier gas connected to the the volume of powder periodically delivered by the metering intermediate chamber, the said tube leading into the intermediate chamber preferably at a level higher than the powder level obtained from a single metered powder delivery, the tube being provided with a rapid opening shut-off valve; and powder conveyor piping having an internal diameter between 6 and 60 mm, preferably between 10 and 30 mm, connecting the bottom part of the intermediate chamber to the fluidised-bed reactor, the said piping having a horizontal portion or a portion deviating from the horizontal by not more than 30° and being provided with a full bore rapid-opening valve situated near to the fluidised bed reactor.

The essential task of the intermediate chamber is to reduce considerably the compactness and settling of the catalytically active powder, which is generally compressed under a heavy load in the storage enlosure and particularly during its passage through the metering device, before being conveyed to the fluidised-bed reactor. The introduction of a powder which is too compacted would require first of all the use of an inert carrier gas under too high a pressure and would consequently involve the introduction of a large quantity of inert carrier gas into the reactor. The form and size of the intermediate chamber are therefore designed to mitigate these problems.

Preferably the intermediate chamber consists of a vertical cylindrical container having a lower portion which is conical or in the form of a truncated cone. The capacity of this intermediate chamber is at least 1.1 times, preferably at least 1.5 times the volume of the powder delivered periodically by the metering device. However, the capacity of this intermediate chamber may be considerably larger; it is preferred that the capacity should not exceed 5 times, most preferably between 1.5 and 3 times, the volume of the powder delivered periodically by the metering device in order to avoid the introduction of substantial quantities of inert carrier gas into the fluidised bed reactor.

The supply tube for the inert carrier gas is connected via the rapid opening shut-off valve to the intermediate chamber, preferably to a point located in its top half, and most preferably in the immediate vicinity of the outlet aperture from the metering device, in such a way that the supply tube for the inert carrier gas leads out above the top level of the catalytically active powder when the latter has been delivered to the intermediate chamber. In the case where the said supply tube for the inert carrier gas is connected to a lower portion of the intermediate chamber, a part of the catalytically active powder may not be introduced into the fluidised-bed reactor and may become deposited along the powder conveyor piping, leading rapidly to the piping becoming clogged.

The powder conveyor piping connecting the intermediate chamber to the fluidised-bed reactor, has an internal diameter comprised between 6 and 60 mm and preferably comprised between 10 and 30 mm; an inadequate internal diameter of less than 6 mm would run the risk of causing clogging and too wide a diameter would run the risk of causing upset in the fluidised-bed, or difficulties as regards gas-tightness of the full bore rapid opening valve.

The powder conveying piping comprises a portion which is disposed horizontally or which deviates from the horizontal by not more than 30°, preferably by not more than 20°. Any such deviation from the horizontal can be upwardly or downwardly in relation to the direction of flow through the piping.

The base of the intermediate chamber is provided with an outlet which is connected to the powder conveying pipe. The powder conveying pipe comprises an elbow or a bend which is situated between the said outlet and the portion of the pipe which is horizontal or deviates from the horizontal by not more than 30°. Preferably the elbow or bend is close to, or commences directly at the outlet of the intermediate chamber. However, the elbow or bend can be separated from the outlet of the intermediate chamber by a further portion of tube through which the powder may fall under gravity. In this case the further portion of tube is preferably vertical. The elbow or bend mentioned above can comprise a sharp angle; however, it preferably comprises a curved portion wherein the radius of curvature is suitably less than 5 times, preferably less than or equal to 3 times the internal diameter of the powder conveying pipe. By this means the conveyance of powder from the intermediate chamber to the fluidised bed reactor can be accomplished in a very short time, generally less than two seconds and using only a small quantity of inert carrier gas.

The metered volume of powder delivered by the metering valve is suitably sufficient to close at least the elbow or bend portion of the powder conveying piping. Under these circumstances the powder can be caused to flow into the fluidised bed reactor as a "plug" by operating the rapid opening shut off and full bore valves.

The angle of the elbow or bend formed by the powder conveyer piping is selected bearing in mind the natural flowability of the powder inside this piping. Thus for a powder which flows with difficulty, it is preferable to use an elbow or bend forming an obtuse angle, whereas for a powder which flows very easily, on the other hand, it can be preferable to use an elbow or bend forming a right angle or an acute angle. However, an elbow or bend with an angle of less than 60° or over 120° would in all cases run the risk of causing either clogging or of introducing into the fluidised bed reactor irregular quantities of the powder together with excessive quantities of carrier gas.

The capacity of the powder conveyor piping is preferably less than or equal to the volume of the powder delivered periodically by the metering device, in order to ensure the conveyance of the powder in a plug flow manner to the fluidised-bed reactor and to limit the quantity of inert carrier gas introduced into the reactor.

It has often been noted that the catalytically active powder disperses with difficulty on its arrival in the fluidised-bed reactor, particularly if the reactor is operating on the industrial scale. In such a reactor, the internal diameter of which is generally over 1 meter, and in particular comprised between 1 and 6 meters, it is observed that bubbles of gas, when they rise into the fluidised-bed, have a tendency to concentrate in the axial zone of the reactor. The zones close to the reactor wall are consequently less well agitated by the gas bubbles. The result is that the powder freshly introduced in the vicinity of the reactor walls is relatively poorly dispersed and this tends to cause the "hot spots" responsible for the formation of agglomerates of molten polymer. It has been found according to the present invention that in order to favour the dispersion of the catalytically active powder in the fluidised-bed, it is advantageous to extend the powder conveyor piping inside the reactor over a length such that its end is located at a distance (from its entry point in the reactor wall) which lies in the range between 1/60 and 1/5, preferably between 1/16 and 1/7 of the diameter of the reactor. Under these conditions the introduction of the powder with catalytic activity takes place in the zone of the reactor where there is a good degree of movement.

In order to avoid any risk of deposit of the catalytically active powder inside the powder conveyor piping, it is advisable for this piping to merge into the fluidised-bed reactor at an angle towards the base which may be as much as 60° in relation to the horizontal, and in particular an angle comprised between 10° and 50°. It is also advisable when this piping pentrates the interior of the fluidised-bed reactor, to use piping whose internal surface and possibly the external surface, is as smooth as possible.

The full-bore rapid-opening valve located on the powder conveyor piping may for example be a plug valve and should be capable of being actuated by a control assuring the transition from fully opened position to fully closed position and vice versa in a very short period, for example of less than 3 seconds and preferably less than 1 second.

Generally, in order to favour the regular introduction of powder with catalytic activity into the fluidised-bed reactor, it is preferable to facilitate the filling of the metering device by arranging, for example, an intermediate storage enclosure between the storage enclosure and the said metering device. The two storage enclosures are preferably connected to each other by a full bore valve permitting of the transfer of the powder from one to the other and by a vent line to ensure that pressures are balanced. The intermediate storage enclosure may for example have a capacity comprised between 10 and 100 times the volume of powder delivered by the metering device. The intermediate storage enclosure can be, for example, a vertical cylinder or cylindro-conical in form such that for example the ratio of its height to its greater diameter is less than or equal to 1.

The metering device may be chosen from a large variety of appliances. It may in particular be of the rotary type, and comprise at least one cavity which is put alternately in communication with, on the one hand, the storage enclosure or the intermediate storage enclosure and on the other hand the intermediate chamber. This cavity preferably has a truncated conical form the diameter of whose base is comprised between 0.5 and 10 times its height. The metering device is preferably gas-tight under the pressure existing upstream and downstream of this device; but this tightness is not regarded as an essential element of the device, since if necessary the pressure may be identical upstream and downstream of this device.

With a view to facilitating emptying of the catalytically active powder from the metering device, when the latter is of the rotary type with a cavity, it is possible to fix a mechanical arrangement such as a helical spring at the bottom of the cavity. This mechanical arrangement permits of regular drainage of the cavity, despite the compacting effect undergone by the powder during the operation of the metering device.

The inlet aperture of the intermediate chamber suitably has a shape and size equivalent to or larger than the outlet aperature of the metering device.

The feeding device according to the present invention is particularly suited to industrial-scale production reactors having a large capacity, and for which the metering device may deliver quantities of powder with catalytic activity which may amount for each metered portion to as much as 1500 g and generally quantities comprised between 500 and 1200 g.

The device according to the invention can be operated in the following manner:

a. when the shut-off valve of the inert carrier gas supply tube and the full bore rapid-opening valve of the powder conveyor pipe are closed:

the ratio of the pressures existing between the inside of the storage enclosure of the intermediate storage enclosure and the inside of the intermediate chamber is at least equal to 1 and preferably comprised beween 1.0 and 1.5, the difference between these two pressures being preferably less than 1 MPa; these pressure conditions on the one hand favour regularity of delivery, by means of the metering device, of a metered quantity of catalytically active powder to the intermediate chamber, and on the other hand an appropriate settling of this powder delivered to the intermediate chamber;

the ratio of the pressures existing inside the supply tube for the inert carrier gas and the inside of the intermediate chamber is comprised between 1.1 and 1.5 and preferably comprised between 1.1 and 1.3, the difference between these two pressures being comprised between 0.1 and 1.2 MPa and preferably comprised between 0.2 and 0.8 MPa; these pressure conditions make it possible to guarantee the conveyance of the whole of the powder contained in the intermediate chamber to the fluidised-bed reactor, without the appearance of attrition or compacting phenomena;

the difference in pressure existing between the inside of the intermediate chamber and the inside of the fluidised-bed reactor is comprised between 0.025 and 0.25 MPa, and preferably equal to a quarter of the pressure difference existing between the inside of the supply tube for the inert carrier gas and the inside of the intermediate chamber; these pressure conditions prevent the gas stream circulating in the fluidised-bed reactor from penetrating into the powder conveyor piping and reaching the storage enclosure: they also avoid undue settling of the powder during its conveyance to the fluidised-bed reactor.

b. the introduction of catalytically active powder into the fluidised-bed reactor is carried out by a sequence of operations comprising sequentially;

the delivering by means of the metering device a metered volume of powder to the intermediate chamber, the shut-off valve of the supply tube for the insert carrier gas and the full bore rapid-opening valve of the powder conveyor piping being closed, opening the shut-off valve of the supply tube for inert carrier gas and of the full bore rapid-opening valve of the powder conveyor piping, during a period such that the volume of inert carrier gas introduced into the fluidised-bed reactor, measured under normal conditions of pressure and temperature, is comprised between 0.15 and 0.6 $m^3$ per kg of powder delivered by the metering device, the speed of the inert carrier gas through the powder conveyor piping being comprised between 1 and 15 meters per second and preferably comprised between 3 and 10 meters per second.

The storage enclosure and the also the intermediate storage enclosure of the powder are maintained under an atmosphere of inert gas. As inert gas one may select for example nitrogen, hydrogen, methane, ethane or propane.

The inert carrier gas scavenging the intermediate chamber and the powder conveyor piping may be chosen from for example nitrogen, hydrogen, methane, ethane or propane, it being possible for this gas to be identical to or different from that constituting the atmosphere of the storage enclosure and the intermediate storage enclosure.

The device and process according to the present invention are particularly suited to the introduction into a reactor for the polymerisation or copolymerisation of gaseous alpha-olefins in a fluidised-bed, of a catalytically active powder consisting of particles having a mean diameter by mass between 100 and 400 microns, preferably between 125 and 300 microns, a relatively narrow particle size distribution, such that the ratio of the mean diameter by mass Dm to the mean diameter by number Dn of the particles is less than or equal to 4, and bulk density at rest between 0.2 and 0.45 g/cm$^3$. This powder with catalytic activity may in particular contain 0.1 to 10%, preferably 0.25 to 5% by weight of one or more organometallic compounds of a metal belonging to Groups II or III of the Period Table of Elements. Such a powder, which is generally rendered sticky by the presence of a liquid organometallic compound, is nevertheless introduced without difficulty by means of this device and according to the process of the present invention.

The catalytically active powder can comprise, for example a catalyst system of the Ziegler-Natta type containing on the one hand, a catalyst comprising a compound of a transition metal belonging to Groups IV, V or VI of the Periodic Table of Elements, and optionally a magnesium compound, and on the other hand, a co-catalyst comprising an organometallic compound of a metal belonging to Groups II or III of the Periodic Table. The catalytically active powder can likewise comprise a catalyst comprising a chromium oxide compound associated with a granular refractory oxide support material and activated by thermal treatment at a temperature between 250° and 1200° C. under a non-reducing, preferably an oxidising atmosphere.

One can also use according the present invention a catalytically active powder comprising a catalyst system liable not to show an induction period at the moment when this powder is brought into contact with the alpha-olefin or alpha-olefins to be polymerised, and in particular to display instantaneously a maximum initial rate of polymerisation. The feeding device and process are suitable in particular, when the catalytically active powder is a prepolymer obtained by contacting one or more alpha-olefins with a catalyst of the Ziegler-Natta type or with a catalyst comprising chromium oxide (of the type described above) optionally in the presence of at least one organometallic compound of a metal of Groups II or III of the Periodic Table of Elements. This prepolymer may have a density, for example between 0.90 and 0.97 and contain from $2 \times 10^{-3}$ to $10^{-1}$ milligram atoms of transition metal per gram in relation to catalysts of the Zielger-Natta type, or $4 \times 10^{-5}$ to 3 milligram atoms of chromium per gram when the catalyst comprises a chromium oxide compound. This may also have a content of polymer soluble in n-heptane at 70° C. comprised between 0.1 and 5% by weight. As compared with an essentially mineral powder, comprising for example a silica support, such as prepolymer powder is more difficult to handle, owing to the presence of sticky product, consisting of polymers of a low molecular weight, and of electrostatic forces existing between the prepolymer particles.

It has been observed in industrial use that the sequence of operations permitting the introduction into the fluidised-bed reactor of a given quantity of catalytically active powder may be conveniently repeated at a frequency of up to 6 times per minute, and preferably between 1 and 2 times per minute. In particular this device is suited to feed through-puts generally comprised between 50 and 500 kg per hour of catalytically active powder.

Method for determining the mean diameters by mass (Dm) and by number (Dn) of particles According to the invention the mean diameters by mass (Dm) and by number (Dn) of the particles of powder with catalytic activity are measured by microscope examination by means of the OPTOMAX image analyser (Micro-Measurements Ltd., Great Britain). The measuring principle theory consists in obtaining from the experimental study by light-optical microscopy of a population of particles, a table of absolute frequencies giving the number (ni) of particles belonging to each class (i) of diameters, each class (i) being characterised by an intermediate diameter (di) comprised between the limits of the said class. According to the authorised French Standard NF X 11-630 of June 1981, Dm and Dn are provided by the following formulae:

$$\text{diameter by mass: } Dm = \frac{\Sigma ni(di)^3 di}{\Sigma ni(di)^3}$$

$$\text{mean diameter by number: } Dn = \frac{\Sigma ni \cdot d}{\Sigma ni}$$

The ratio Dm:Dn characterises the particle size distribution; it is sometimes know as the "particle size distribution width".

The measurement by the OPTOMAX image analyser is performed by means of inverted microscope which permits of the examination of suspensions of particles of powder with catalytic activity at an enlargement comprised between 16 and 200 times. A television camera picks up the images given by the inverted microscope and transmits them to a computer which analyses the images received line by line and dot by dot on each line, in order to determine the dimensions or diameters of particles and then to classify them.

The following non-restrictive examples of a device illustrates the present invention.

FIG. 1 shows in diagrammatical form a feeding device for catalytically active powder into a fluidised-bed reactor, without intermediate storage enclosure. The device represented by FIG. 1 comprises a fluidised-bed polymerisation reactor (1) a storage enclosure (2) for powder with a catalytic activity, provided with a feed line (3) for powder with catalytic activity and a shut-off valve (26), a metering device (4) making it possible to deliver regularly a metered volume of powder with catalytic activity to an intermediate chamber (5). This intermediate chamber (5) is fitted in its upper part with a supply tube (6) for inert carrier gas, provided with a shut-off valve (7); it is connected at its lower part to a powder conveyor pipe (8) having a connecting portion comprising a vertical tube which is linked to the pipe (8) by means of an elbow (9) having an angle close to 90°. This powder conveyor piping (8) is provided with a full bore rapid-opening valve (10) and emerges into the fluidised-bed reactor (1) at a downward angle of about 30° in relation to the horizontal, a part (11) of this piping (8) penetrating inside the reactor (1).

Figure 2:
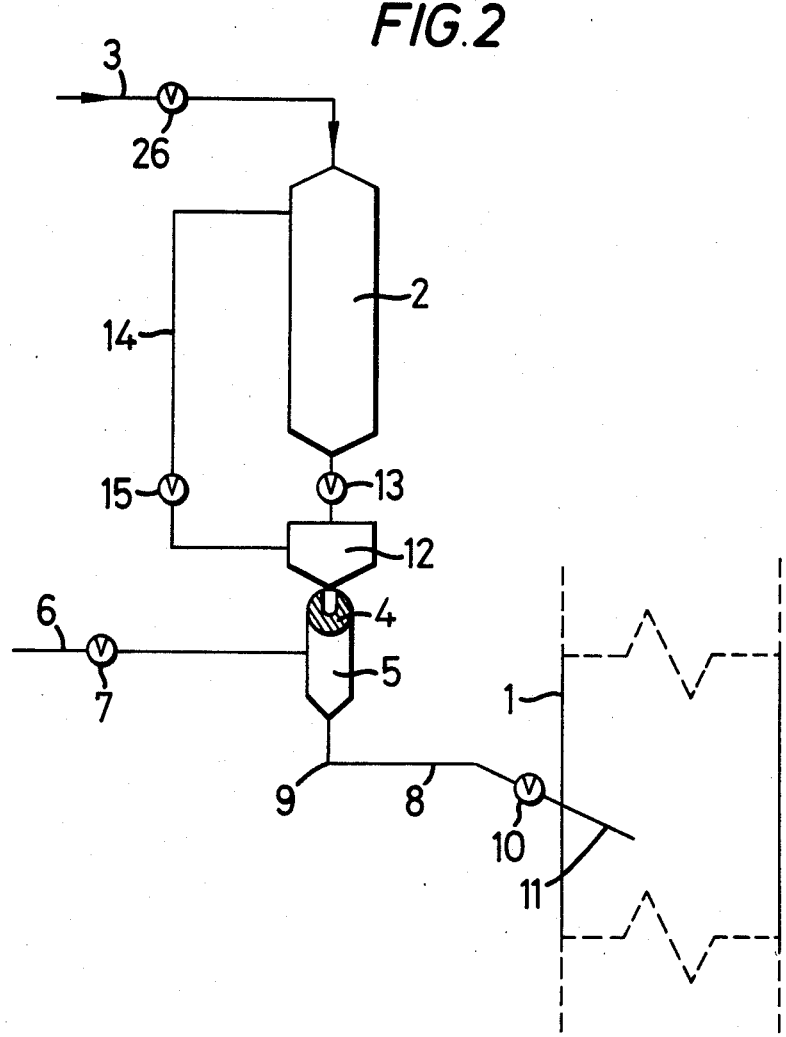

FIG. 2 represents in diagrammatical form a feeding device for catalytically active powder into a fluidised-bed reactor, this device being analogous to that of FIG. 1, but comprising in addition an intermediate storage enclosure (12) arranged between the storage enclosure (2) and the metering device (4); a full bore valve (13) is arranged between the two storage enclosures (2) and (12) and a vent line (14) provided with a valve (15) guarantees balancing of the pressure between the two storage enclosures (2) and (12).

Figure 3:
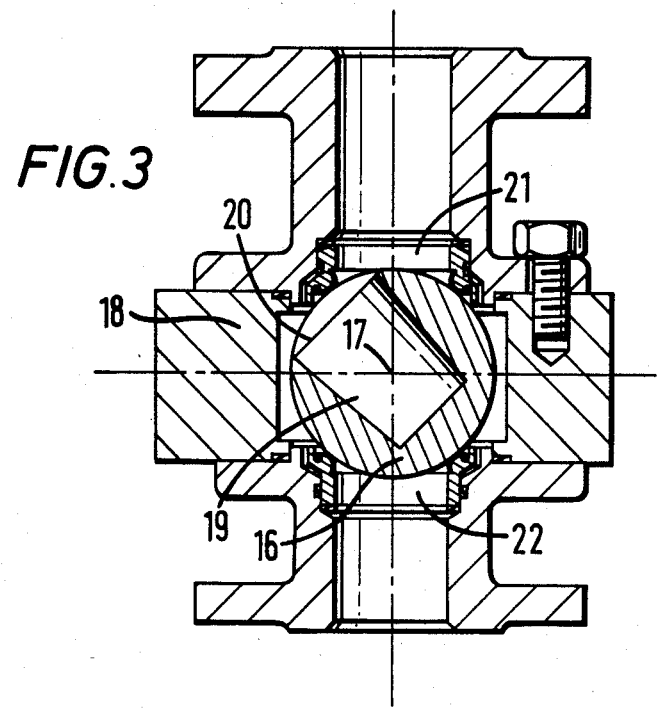

FIG. 3 shows in diagrammatical form a metering device of the rotary type, consisting of a ball valve (16) rotating around an axis (17) inside a body (18); the ball valve (16) is provided with a cavity (19) in the form of a truncated cone possessing only a single aperture (20); the body (18) of the valve comprises a powder feed aperture (21) located on the top part of the body (18) and a powder discharge aperture (21) located on the bottom part of the body (18); the ports of the apertures or conduits (21) and (22) are of the same form and the same dimensions as the aperture (20); the ball valve (16) and the body (18) are provided with devices such as joints or packings guaranteeing gas-tightness between the ball valve (16) and the fixed body (18).

Figure 4:
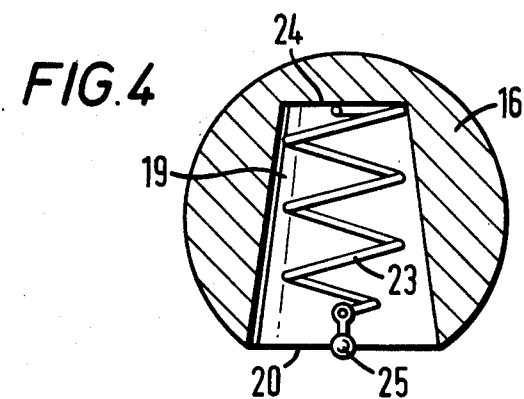

FIG. 4 shows in diagrammatical form the ball valve (16) with its cavity (19) in the form of a truncated cone and a helical spring (23) arranged in the cavity (19) and fixed in the bottom (24) of the latter; when the aperture (20) of the cavity (19) is oriented upwards, the helical spring (23) is compressed under the effect of its weight and the cavity (19) fills with powder; when the aperture (20) of the cavity (19) is oriented downwards, the helical spring (23) expands and facilitates drainage of the powder out of the cavity (19); a weight (25) fixed to the free end of the spring (23) reinforces its effect.

EXAMPLE

Polymerisation of ethylene is carried out using an installation comprising a fluidised bed reactor (1) to which is connected a device for feeding catalytically active powder according to the invention, in accordance with the diagrams of FIGS. 1, 3 and 4.

The storage enclosure (2) as shown in FIG. 1, contains the powder consisting of a prepolymer obtained by contacting on the one hand a catalyst system comprising a catalyst which contains per gram atom of total titanium, 0.92 gram atom of trivalent titanium, 0.08 gram atom of tetravalent titanium, 3.8 gram atoms of magnesium, 8.6 gram atoms of chlorine and 2 gram equivalents of propylene and tri-n-octylaluminium in a quantity such that the ratio of the number of gram atoms of aluminium to the number of gram atoms of titanium is equal to 1.5, and on the other hand, ethylene in a quantity such that the prepolymer contains $2 \times 10^{-2}$ milligram atoms of titanium per gram. This prepolymer has a bulk density at rest equal to 0.3 g/cm$^3$ and a density of 0.96; it consists of particles having a mean diameter by mass equal to 200 microns and a particle size distribution such that the ratio Dm:Dn of the particles is equal to 3. Moreover, it has, on the one hand a content of 1% by weight of liquid tri-n-octylaluminium and on the other hand, a content of 2% by weight of polymer soluble in n-heptane at 70° C.

This prepolymer contained in the storage enclosure (2) is maintained under a pressure of 2.6 MPa of hydrogen at ambient temperature (20° C.).

The metering device (4), of the rotary type, shown in FIG. 3, comprises in particular a cavity (19) of a capacity of 2.8 liters, in the form of a truncated cone, the diameter of whose base is 0.9 times its height. The cavity (19) represented by FIG. 4, contains a weight (25) of 250 g attached to the helical spring 23.

The intermediate chamber (5) arranged just below the metering device (4) is of cylindro-conical form, with vertical axis, and a capacity of 4 liters.

The inert carrier gas is hydrogen, maintained under a pressure of 2.7 MPa in the supply tube (6) which leads out into the upper part of the intermediate chamber (5), in the immediate vicinity of the outlet aperture (22) from metering device (4). When the shut-off valve (7) of the supply tube (6) of hydrogen and the full bore rapid opening valve (10) of the powder conveyor pipe (8) are closed, the hydrogen pressure existing inside the intermediate chamber (5) is 2.3 MPa.

The intermediate chamber (5) comprises in its lower part a powder conveyer pipe (8) comprising a horizontal portion and having an internal diameter of 25 mm and a capacity of 1.5 liters. This piping (8) which is connected to the intermediate chamber (5) comprises a vertical portion immediately followed by a horizontal portion, producing a right angle bend (9). The piping is provided with a full bore rapid opening valve (10), actuated by a control ensuring its complete opening or closure in about 0.5 seconds. The powder conveyer piping (8) emerges into the fluidised bed reactor (1) at an angle of 30° in relation to the horizontal and extends inside the reactor (1) over a length of 30 cm. The piping (11) which penetrates inside the reactor (1) is in polished stainless steel inside and outside.

The fluidised bed reactor (1) has the form of a cylinder with a diameter of 3 meters. A rising gas mixture circulates inside the fluidised bed reactor at a rate of 45 cm/sec, under a constant pressure of 2.15 MPa and at 92° C. This gas mixture comprises 42% by volume ethylene, 40% hydrogen, 10% ethane and 8% nitrogen.

A prepolymer introduction sequence is performed in the fluidised bed reactor (1) by carrying out the following operations:

the ball valve (16) of the metering device (4) of rotary type is placed in the position for filling the cavity (19), the aperture (20) of which is oriented upwards, facing the storage enclosure (2) containing the prepolymer, the shut-off valve (7) and full bore rapid opening valve (10) being closed;

the ball valve (16) of the metering device (4) rotates around its axis (17) through an angle of 180°, causing the drainage of the cavity (19), the aperture (20) of which is oriented downwards, facing the intermediate chamber (5) to which is delivered a quantity of prepolymer equal to 900 g;

the shut-off valve (7) and the full bore rapid opening valve (10) open; the hydrogen passes through the powder conveyer pipe (8) carrying the 900 g of prepolymer to the fluidised bed reactor (1) at a rate of 6 meters per second, for a period of about 1 second;

the full bore rapid opening valve (10) and the shut-off valve (7) are closed again, whilst the ball valve (16) of the metering device (4) rotates around its axis (17) through an angle of 180° so as to come into the filling position for the cavity (19).

A fresh prepolymer introduction sequence can then be carried out. These introduction sequences are reproduced at a frequency of one injection every 50 seconds, which makes it possible to obtain polyethylene production of about 5000 kg per hour. As has been noted, after several weeks of operation under these conditions, the device and process of the invention make it possible to obtain a polyethylene powder of excellence and uniform quality, practically free from agglomerate of prepolymer or molten polymer.

We claim:

1. Device for introducing a catalytically active powder into a fluidized bed reactor for polymerization or copolymerization of gaseous alpha olefins, the said device being characterized in that it comprises a storage enclosure for catalytically active powder adapted to feed the powder to a metering device, the metering device being capable of communicating sequentially with the storage enclosure and with an intermediate chamber and permitting periodic delivery into this chamber of a metered volume of the powder, the intermediate chamber being placed below the metering device to receive direct the powder delivered by the latter, the said intermediate chamber having a capacity of at least 1.1 times the volume of powder periodically delivered by the metering device, a supply tube for inert carrier gas connected to the intermediate chamber, the said tube leading into the top half of the intermediate chamber, the tube being provided with a rapid opening shut-off valve, powder conveyor piping having an internal diameter between 6 and 60 mm connecting the base of the intermediate chamber to the fluidised bed reactor, the said pipe having a horizontal portion or a portion deviating from the horizontal by not more than 30° and an elbow which is situated between the outlet of the intermediate chamber and the portion of the pipe which is horizontal or which deviates from the horizontal by not more than 30°, and being provided with a full bore rapid opening valve situated near to the fluidized bed reactor.

2. Device in accordance with claim 1, characterized in that an intermediate storage enclosure is arranged between the storage enclosure and the metering device, the two enclosures being connected to each other by a full bore valve permitting the transfer of powder from one to the other, a vent line being arranged between the two enclosures to guarantee pressure equilibrium, the said intermediate storage enclosure having a capacity between 10 and 100 times the volume of powder periodically delivered by the metering device and a cylindrical or cylindro-conical shape with vertical axis such that the ratio of its height to its largest diameter is less than or equal to one.

3. Device in accordance with claim 1 or claim 2, characterized in that the metering device is of rotary type and that it comprises at least one cavity which can communicate alternately with the storage enclosure or the intermediate storage enclosure and the intermediate chamber, this cavity having the shape of a truncated cone, the diameter of whose base is between 0.5 and 10 times its height.

4. Device in accordance with claim 1 or 2, characterized in that the full bore rapid opening valve of the powder conveyor piping is actuated by a control which guarantees its complete opening or closing in a time of less than 3 seconds.

5. A device in accordance with claim 1, wherein the supply tube for inert carrier gas connected to the intermediate chamber is led into the intermediate chamber at a level higher than the powder level obtained from a single metered powder delivery.

6. A device in accordance with claim 1, wherein the powder conveyor piping has an internal diameter between 10 and 30 mm.

7. A device in accordance with claim 1, characterized in that the elbow comprises a curved portion wherein the radius of curvature is less than 5 times the internal diameter of the powder conveying pipe.

8. A device in accordance with claim 4, characterized in that the full bore rapid opening valve of the powder conveyor piping is actuated by a control which guarantees its complete opening or closing in a time of less than 1 second.

* * * * *